United States Patent

Yamamoto et al.

[11] Patent Number: 5,951,398
[45] Date of Patent: Sep. 14, 1999

[54] ENCODER FOR GAME MACHINE

[75] Inventors: Tamotsu Yamamoto, Ashiya; Masaki Sawada, Osaka, both of Japan

[73] Assignee: Matsushita Electric Industrial Co., Ltd., Japan

[21] Appl. No.: 08/898,860

[22] Filed: Jul. 25, 1997

[30] Foreign Application Priority Data

Jul. 25, 1996 [JP] Japan .................................. 8-195881

[51] Int. Cl.⁶ ..................................................... G01P 13/04
[52] U.S. Cl. .............................................................. 463/37
[58] Field of Search ................................ 463/38, 37, 36, 463/39; 273/148 B; 345/161, 156, 157; 74/471 XY

[56] References Cited

U.S. PATENT DOCUMENTS

| | | | |
|---|---|---|---|
| 4,469,330 | 9/1984 | Asher | 463/38 |
| 4,486,891 | 12/1984 | Kimoto et al. | |
| 4,488,017 | 12/1984 | Lee | 463/38 |
| 4,646,085 | 2/1987 | Mathis | |
| 4,748,441 | 5/1988 | Brzezinski | 463/38 X |
| 4,919,003 | 4/1990 | Lawson et al. | |
| 4,919,437 | 4/1990 | Kibrick et al. | |
| 5,436,640 | 7/1995 | Rieves | 463/38 X |

Primary Examiner—Michael O'Neill
Attorney, Agent, or Firm—Parkhurst & Wendel, L.L.P.

[57] ABSTRACT

A game machine encoder with a rotatable rotary contact panel having a top, a bottom, and a rotary shaft, plural contact portions having a comb-shaped contact portion, a common contact portion, and a further contact portion disposed at the bottom of the rotary contact panel, and plural contact brushes biased toward each contact portion of these plural contact portions. The further contact portion has a detection signal portion for detecting the origin position of the rotary contact panel. Each contact portion of the comb-shaped contact portion, common contact portion and further contact portion is disposed on concentric circles having centers corresponding with the center of the rotary shaft. When the encoder rotates, two sets of contact brushes out of the plural contact brushes open and close to provide a first signal and a second signal having waveforms mutually different in phase, and another set of contact brushes opens and closes to provide a detection signal for detecting the origin position. Every time the rotary contact panel returns to the origin position, the count can be corrected.

30 Claims, 15 Drawing Sheets

FIG. 2
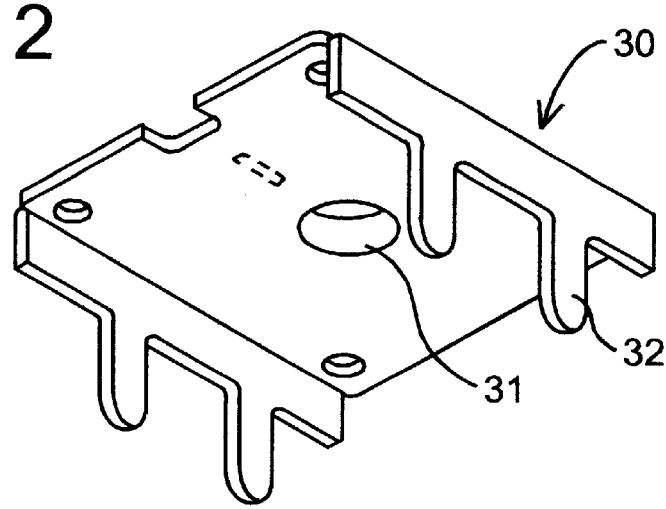
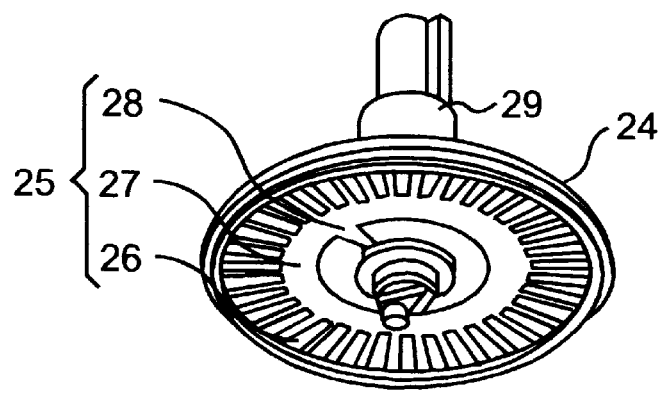
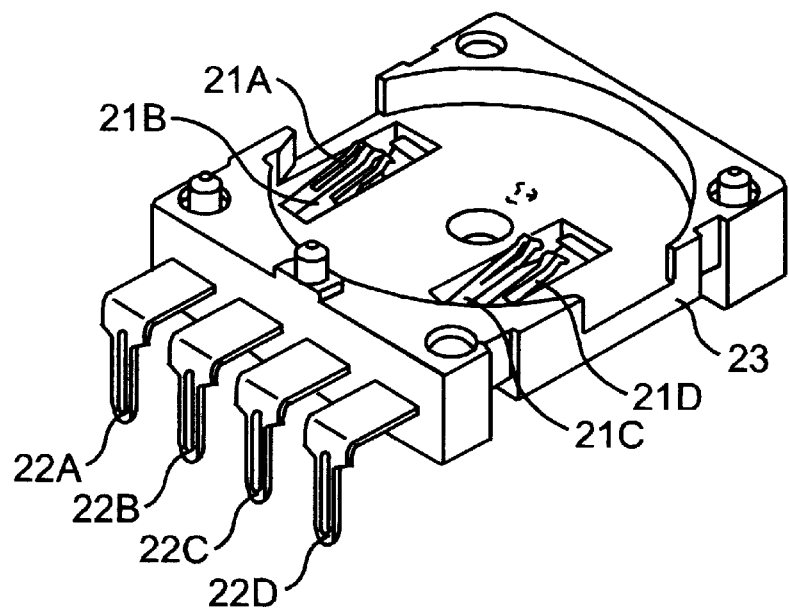

FIG. 11
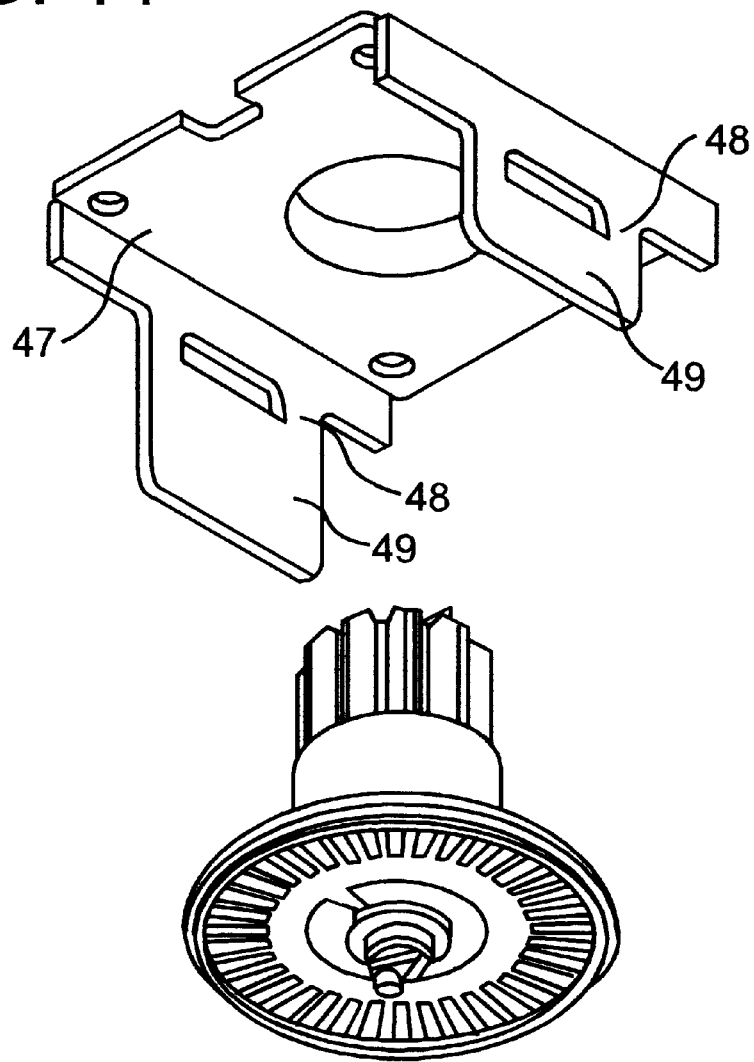
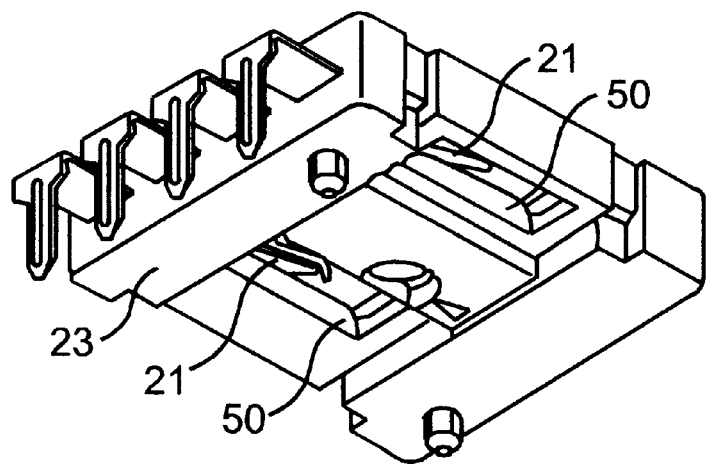

ENCODER FOR GAME MACHINE

TECHNICAL FIELD OF THE INVENTION

The present invention relates to an encoder for a game machine using an encoder that detects the rotation angle of an analog input device.

BACKGROUND OF THE INVENTION

A conventional encoder for a game machine, having for example a left lever unit (L lever) and right lever unit (R lever) for manipulation is described by reference to FIGS. 13 to 15.

FIG. 13 is a perspective view showing a conventional general manipulator for a game machine. In FIG. 13, a cross switch operator 2, and several pushbutton switch operators 3 are disposed side by side on the top of a long flat casing 1. On one side of the long flat casing 1, an L lever 4 and an R lever 5 are disposed side by side. The use of the aforementioned switches is explained below by way of example of a TV car race game. The cross switch operator 2 is used like the steering wheel of a car, the R lever 5 is the accelerator, and the L lever 4 is the brake. The pushbutton switch operators 3 are not used in this case, and hence description with respect to operators 3 is omitted herein.

To accelerate and decelerate the car realistically, the L lever 4 and R lever 5 must not only be on/off switches, but also analog input devices. When the L lever 4 or R lever 5 is not manipulated, it is maximally extended, and the brake and accelerator functions are, accordingly, not effective.

FIG. 14 is a partially cut-away perspective view as seen from the rear side of the R lever 5 of the manipulator for the game machine shown in FIG. 13. FIG. 15 is a waveform diagram of an output signal of the manipulator for the game machine shown in FIG. 13. In FIG. 14, a shaft 6 is inserted into the long flat casing 1. The R lever 5 is rotatably fitted to the shaft 6, and is biased by a return spring 7 so that the R lever 5 is fully popped-out or biased when not depressed.

The R lever 5 has a gear block 8 engaged with a gear 10 provided in the center of a rotary slit panel 9 having multiple radial slits. When the R lever 5 rotates, the rotary slit panel 9 rotates at a multiple number corresponding to the gear ratio of the gear block 8 and gear 10.

Straddling the rotary slit panel 9, two photo interrupters 11A, 11B are disposed. Depending on the rotation of the rotary slit panel 9, a phase difference signal occurs between signal A generated by the photo interrupter 11A and signal B generated by the photo interrupter 11B as shown in FIG. 15, thereby enabling detection of rotation direction and rotation angle.

In the prior art device of FIG. 14, the elements for determining the phase difference shown in FIG. 15 are the two photo interrupters 11A and 11B. However, adjustment and alignment of the configuration of the photo interrupters 11A, 11B within a specified error is complicated thereby adding to manufacturing costs.

Moreover, an analog input device employing photo interrupters has high material cost thereby further increasing the manufacturing cost thereof. To address the above-described problems, a contact type encoder has been proposed in an effort to reduce costs. However, miscounting tends to occur in such devices due to characteristic chattering of the contacts, and thus the contact type encoder cannot satisfy the requirements for a manipulator for a game machine.

SUMMARY OF THE INVENTION

The present invention is directed to solving the problems of the prior art encoders described above. Hence, it is an object of the present invention to provide an encoder for a game machine having excellent reliability while reducing the manufacturing cost thereof and preventing the occurrence of miscounting.

An encoder for a game machine according to the present invention comprises, a rotatable rotary contact panel having a top, a bottom, and a rotary shaft formed in at least one of the top and the bottom, a first contact portion, a second contact portion, and a third contact portion disposed on the bottom of the rotary contact panel, and plural contact brushes, disposed to contact elastically with a specific contact portion out of the first contact portion, the second contact portion, and the third contact portion, being mutually isolated electrically.

When the rotary contact panel rotates, at least two sets of contact brushes out of the plural contact brushes generate a first electrical signal and a second electrical signal having waveforms mutually different in phase, another set of contact brushes out of the plural contact brushes generates a detection signal for detecting the origin position of the rotary contact panel.

Preferably, the encoder further comprises, a bearing for rotatably supporting the rotary contact panel, wherein the rotary shaft is engaged with the bearing.

Preferably, the first contact portion, the second contact portion, and the third contact portion are respectively disposed on a first circle, a second circle, and a third circle, having their centers corresponding with the center of the rotary shaft of the rotary contact panel, the first contact portion is a comb-shaped contact portion arranged on the first circle, the second contact portion is a common contact portion having continuous contacts on the second circle, and the third contact portion has at least one contact portion on the third circle.

Preferably, the plural contact brushes have a first contact brush, a second contact brush, a third contact brush, and a fourth contact brush, the comb-shaped contact portion elastically contacts with the first contact brush and the second contact brush, the common contact portion elastically contacts with the fourth contact brush, the third contact portion elastically contacts with the third contact brush, and when the rotary contact panel rotates one turn, the first electrical signal having a first waveform is generated between the first contact brush and the fourth contact brush, the second electrical signal having a second waveform is generated between the second contact brush and the fourth contact brush, the first waveform and the second waveform having mutually different phases, and the detection signal having one pulse is generated between the third contact brush and the fourth contact brush.

Preferably, the encoder further comprises, an electrically insulated brush board on which individual contact brushes of the plural contact brushes are fixed.

Preferably, the plural contact brushes have terminals at other ends of the contact brushes, a part of the terminals is fixed on the brush board, and an end portion of the terminals is exposed from the brush board.

Preferably, the encoder further comprises, plural terminals held in the brush board, wherein a portion of each one of the contact brushes is linked to each terminal of the plural terminals.

Preferably, the brush board is formed of a resin member, the portion of each one of the contact brushes and the terminals are integrally fixed to the brush board by insert molding of the resin member.

Preferably, the encoder further comprises, a cover body fixing the bearing, wherein a disk of the rotary contact panel is disposed between the brush board and cover body.

Preferably, a first mark is formed near the leading end of the rotary shaft, a second mark is formed in at least one of an outer bottom portion of the brush board and near the bearing, and the position of the origin can be visually recognized by comparing the positions of the first mark and the second mark.

Preferably, the rotary shaft has a gear, and the gear is engaged with another gear installed in the game machine.

Preferably, the leading end of the rotary shaft is engaged with the drive unit of the game machine.

According to the present invention, even if a miscount occurs due to characteristic chattering of the contact type encoder, the count error is corrected by the action of the detection signal for confirming the origin position. As a result, when the present encoder is used as the encoder for a manipulator in a game machine, if an error due to miscount occurs, reset is executed every time the encoder returns to the origin position, so that accumulation of errors can be avoided. As a result, excellent reliability is obtained for this analog input device, while its cost can be reduced.

Preferably, the encoder further comprises, a brush board having a penetration hole, being disposed at the bottom side of the rotary contact panel, wherein the rotary contact panel has the rotary shaft projecting from the bottom, the leading end of the rotary shaft projects from the penetration hole, a first mark is formed near the leading end of the rotary shaft, a second mark is formed near the penetration hole of the brush board, and the position of the third contact portion can be visually recognized by comparing the positions of the first mark and the second mark.

Preferably, the brush board is electrically insulated, and fixes each contact brush of the plural contact brushes.

In the above constitution, the angle position of the signal portion for detecting the origin position can be easily confirmed from below.

In another preferred embodiment, the encoder further comprises, a brush board having a penetration hole, being disposed at the top side of the rotary contact panel, wherein the rotary contact panel has the rotary shaft projecting from the top, the rotary shaft is engaged with the bearing, the leading end of the rotary shaft projects from the penetration hole, a first mark is formed near the leading end of the rotary shaft, a second mark is formed near the penetration hole of the brush board, and the origin position can be visually recognized by comparing the positions of the first mark and the second mark.

In this constitution, the angle position of the signal portion for detecting the origin position can be easily confirmed from above.

Preferably, the encoder further comprises, a driving gear installed on the rotary shaft, wherein the rotary shaft is fitted with the bearing, and is projected from the bearing, the driving gear is disposed in the projecting portion of the rotary shaft, a first mark is formed at least above or below the driving gear, a second mark is formed near the bearing, and the origin position can be visually recognized by comparing the positions of the first mark and the second mark.

Preferably, the driving gear is engaged with another gear of the game machine.

In the above constitution, when assembling this encoder into a manipulator of game machine, the assembling setting of the driving gear and gear of the manipulator is accurate and simply achieved, so that the reliability is substantially enhanced.

Preferably, the rotary contact panel has a gear block integrally formed on the rotary shaft, the rotary shaft is fitted with the bearing, and is projected from the bearing, the gear block is disposed in the projecting portion of the rotary shaft, a first mark is formed at least above or below the driving gear, a second mark is formed near the bearing, and the origin position can be visually recognized by comparing the positions of the first mark and the second mark.

Preferably, the rotary contact panel having the gear block and the rotary shaft is integrally formed by using a resin.

Preferably, the driving gear is engaged with another gear of the game machine.

In the above constitution, the assembling setting of the central position and angle position of the rotary contact panel and driving gear is accurate and simply achieved, and hence the reliability of the encoder is substantially enhanced. Moreover, the process for mounting the driving gear is not necessary, thereby further lowering manufacturing cost. Still more, when assembling this encoder into a manipulator of a game machine, the assembling setting of the driving gear and gear of the manipulator is accurate and simple, so that the reliability is even further enhanced.

Preferably, the encoder further comprises, a cover body disposed at the top side of the rotary contact panel, and fixing the bearing, wherein the cover body is fixed on the brush board, incorporating the rotary contact panel.

Preferably, the bearing and the cover body are formed of metal plates, and the cover body is disposed so as to cover the opening of the brush board.

In the above constitution, dustproofing is extremely enhanced substantially in a simple structure.

BRIEF DESCRIPTION OF THE DRAWINGS

Other objects and further features of the present invention are illustrated in the accompanying drawings wherein:

FIG. 2 is a perspective exploded view of the encoder shown in FIG. 1.

FIG. 11 is a perspective exploded view of an encoder for a game machine according to a fourth embodiment of the invention.

DETAILED DESCRIPTION OF THE PREFERRED EMBODIMENTS

Referring now to FIG. 1 through FIG. 12, embodiments of the encoder for a game machine according to the present invention are described in detail below.

First Embodiment

Figure 1:
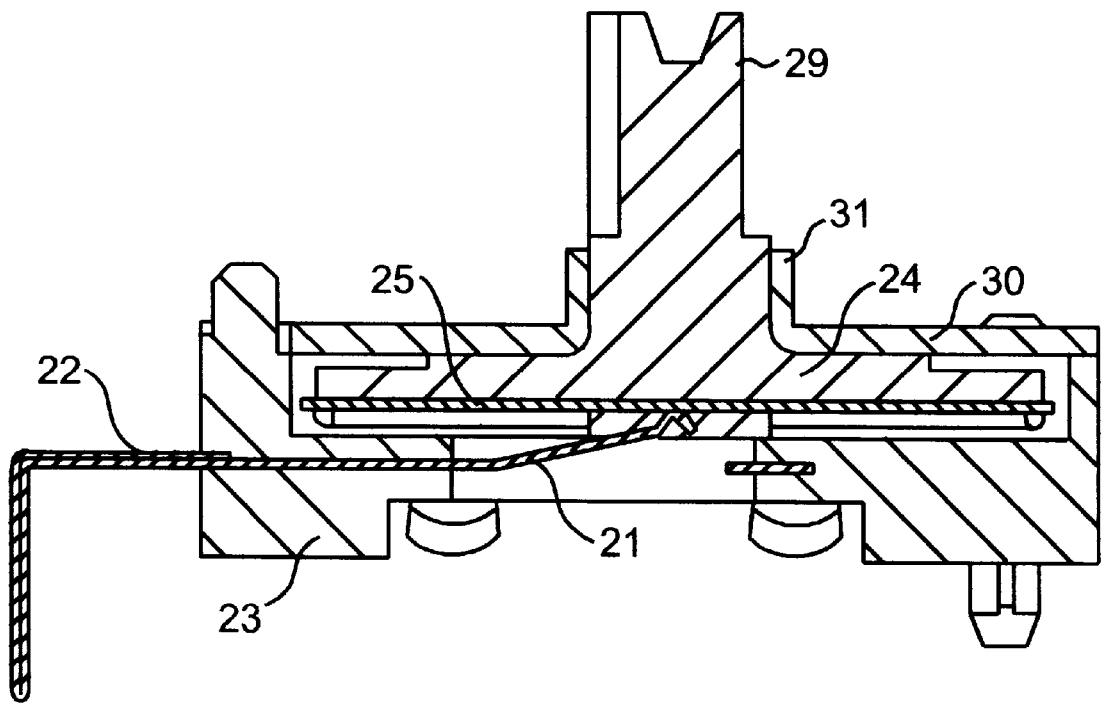
FIG. 1 is a sectional view of an encoder for a game machine according to a first embodiment of the invention.

FIG. 1 is a sectional view of an encoder for a game machine according to a first embodiment of the invention, and FIG. 2 is a perspective exploded view of FIG. 1.

In FIG. 1 and FIG. 2, the encoder comprises a rotary contact panel 24, plural rotary contacts 25 disposed concentrically on the bottom of the rotary contact panel 24, plural contact brushes 21 disposed to contact elastically with the plural rotary contacts 25, and a bearing 31 rotatably supporting the rotary contact panel 24.

The rotary contact panel 24 is substantially disk-shaped and has a rotary shaft 29 projecting from the center thereof. The plural contact brushes 21 have mutually independent first contact brush 21A, second contact brush 21B, third contact brush 21C, and fourth contact brush 21D, all formed of elastic metal and capable of generating electrical signals. Preferably, contact brushes 21A–D each have a contact portion at one end, and a terminal 22A–D, respectively, formed at another end. Each terminal 22A–D is preferably fixed to a brush board 23 formed by molded resin.

It is also possible to link via electrical wire the contact brushes 21A, 21B, 21C, 21D to respective terminals 22A, 22B, 22C, 22D.

The rotary contact panel 24 is made of electrically insulated resin, and plural rotary contacts 25 are fixed to its bottom by insert molding. The plural rotary contacts 25 have a comb-shaped contact portion 26, a common contact portion 27, and a detection signal portion 28 for detecting the origin position. The comb-shaped contact portion 26, common contact portion 27, and detection signal portion 28 are disposed respectively on concentric first, second third circles, all having centers corresponding to a rotary shaft 29. The first contact brush 21A, second contact brush 21B, third contact brush 21C, and fourth contact brush 21D are disposed to contact elastically with specified contact portions of the comb-shaped contact portion 26, common contact portion 27, and detection signal portion 28. The first contact brush 21A contacts the comb-shaped contact portion 26 at a relatively larger circumference than the second contact brush 21B thereby providing contact pairs that open and close at mutually different phases, the third contact brush 21C contacts the detection signal portion 28, and the fourth contact brush 21D contacts the common contact portion 27.

The disk portion of the rotary contact panel 24 is covered with the brush board 23 and cover 30, and the rotary shaft 29 of the rotary contact panel 24 is rotatably fitted and supported by a bearing 31 disposed in the cover 30. The cover 30 has a leg 32 extending downward along the side of the brush board 23, and the leading end of the leg is folded and crimped to the central side of the bottom of the brush board 23. The encoder according to the first embodiment is thus constituted.

When the rotary contact panel 24 rotates through the rotary shaft 29, the comb-shaped contact portion 26 elastically contacts the first contact brush 21A and second contact brush 21B depending on its rotation, the origin position detection signal portion 28 elastically contacts the third contact brush 21C, and the common contact portion 27 elastically contacts the fourth contact brush 21D. The signals generated by a typical rotation are shown in FIG. 3.

Figure 3:
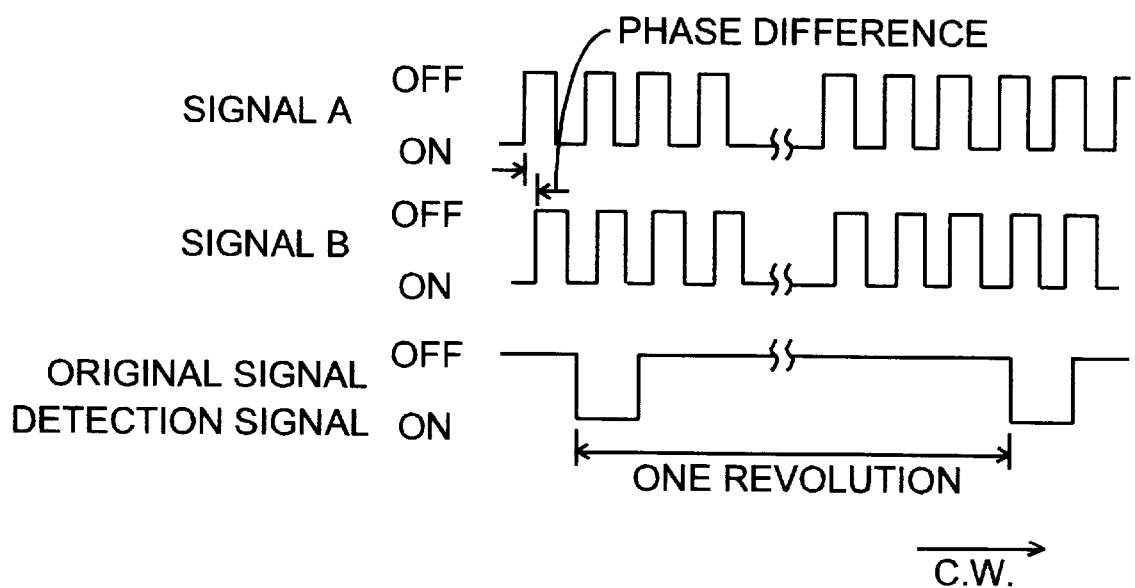
FIG. 3 is a waveform diagram of output signals of the encoder shown in FIG. 1.

In FIG. 3, signal A having a first waveform is delivered between the first terminal 22A and fourth terminal 22D, and signal B having a second waveform is generated between the second terminal 22B and fourth terminal 22D. Signal A and signal B have mutually different phases. While the rotary contact panel 24A makes one turn, such multiple pulse signals are generated. In this way, a phase difference signal is generated between signal A and signal B, and the rotation direction and rotation angle are detected.

The detection signal for detecting the origin position is delivered between the third terminal 22C and fourth terminal 22D, and when the rotary contact panel 24 makes one turn, the signal is generated by one pulse, so that the origin position, or reference, can be confirmed within one revolution. Thus, a reset signal is executed every time each one of the plural contact brushes 21 returns to the origin position, thereby self-correcting miscounts and preventing accumulation of errors. As a result, excellent reliability is realized with the encoder of the present invention.

Figure 4:
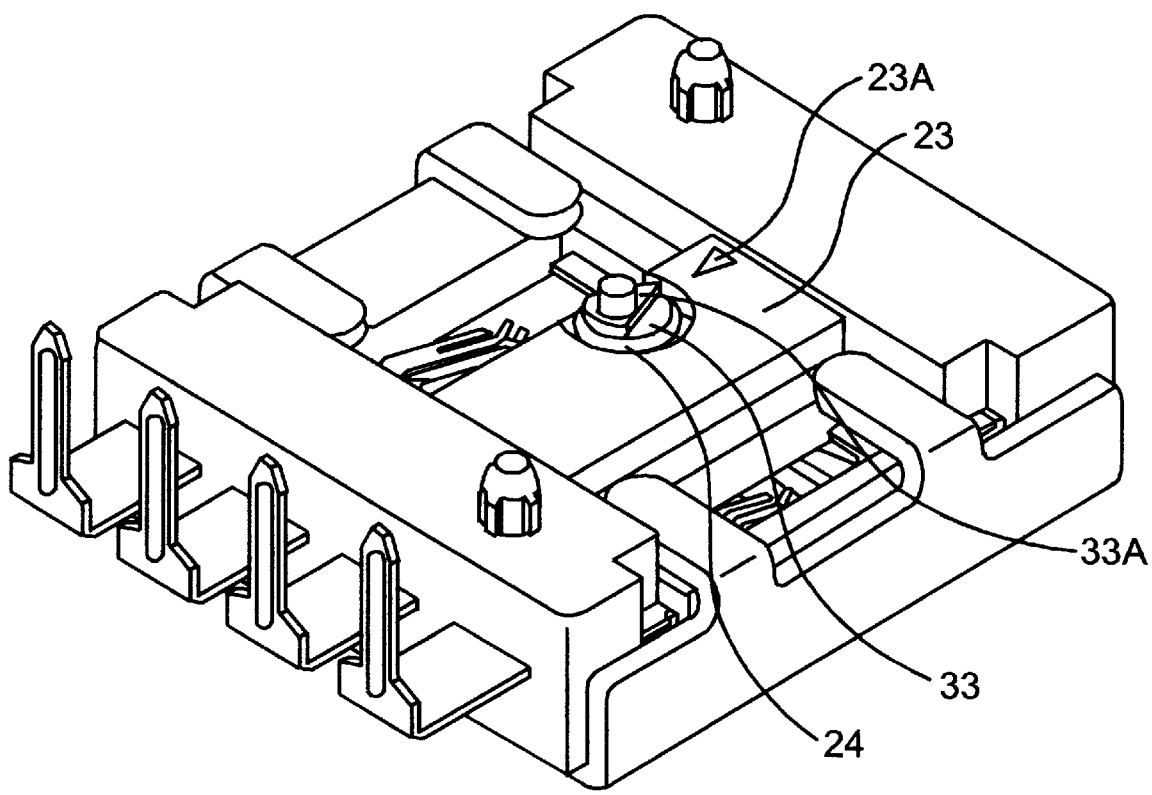
FIG. 4 is an underside perspective view of the encoder shown in FIG. 1.
Figure 5:
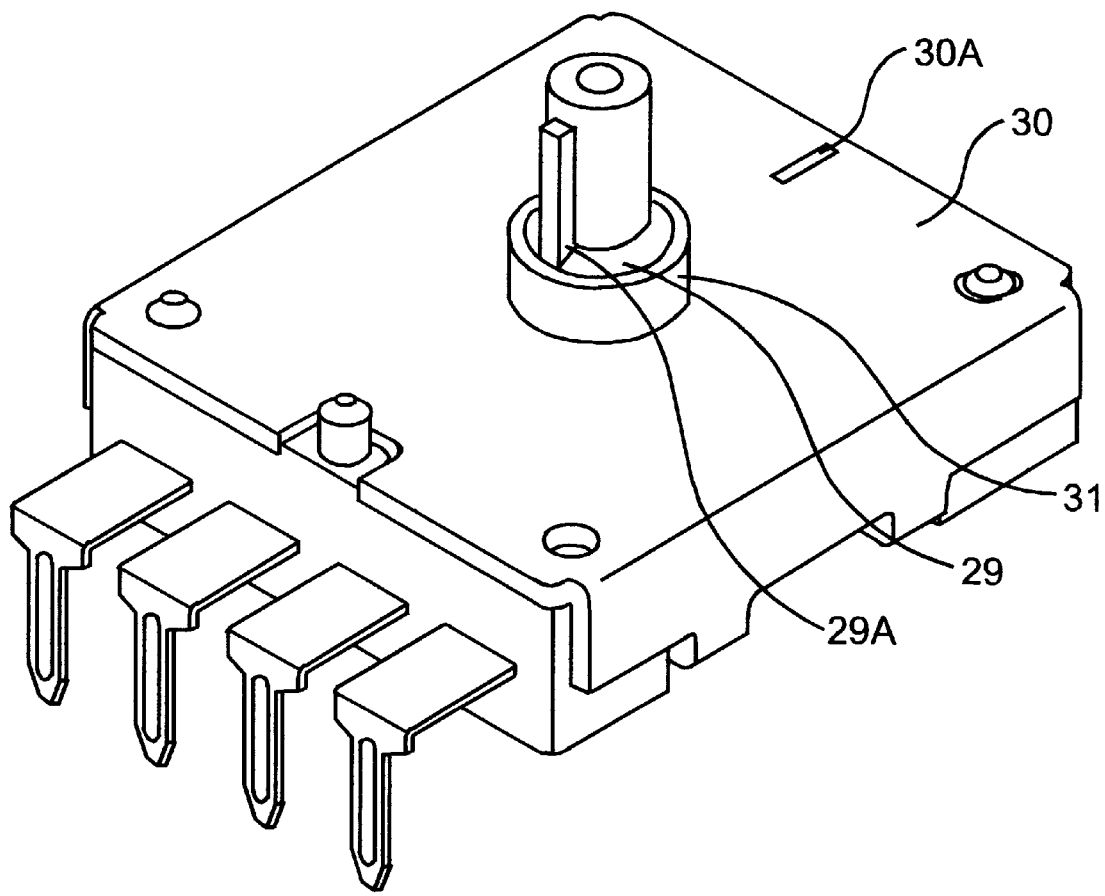
FIG. 5 is an upper side perspective view of the encoder shown in FIG. 1.

A method for visually checking the rotation position of the detection signal portion 28 for detecting the origin position in the encoder of the present invention is shown in FIG. 4 and FIG. 5. In FIG. 4, the leading end of a rotary shaft 33 at the bottom of the rotary contact panel 24 has a mark 33A, and the bottom of the brush board 23 has a mark 23A. In FIG. 5, a protrusion 29A for marking is provided at the upper side of the fitting portion of the rotary shaft 29 of the top of the rotary contact panel 24, and a protrusion 30A for marking is provided at the lateral side of the bearing 31 of the cover 30. In both FIG. 4 and FIG. 5, whether the detection signal portion 28 is located at the origin position (that is, in an ON state) can be easily recognized visually from outside, below or above the encoder.

Second Embodiment

Figure 6:
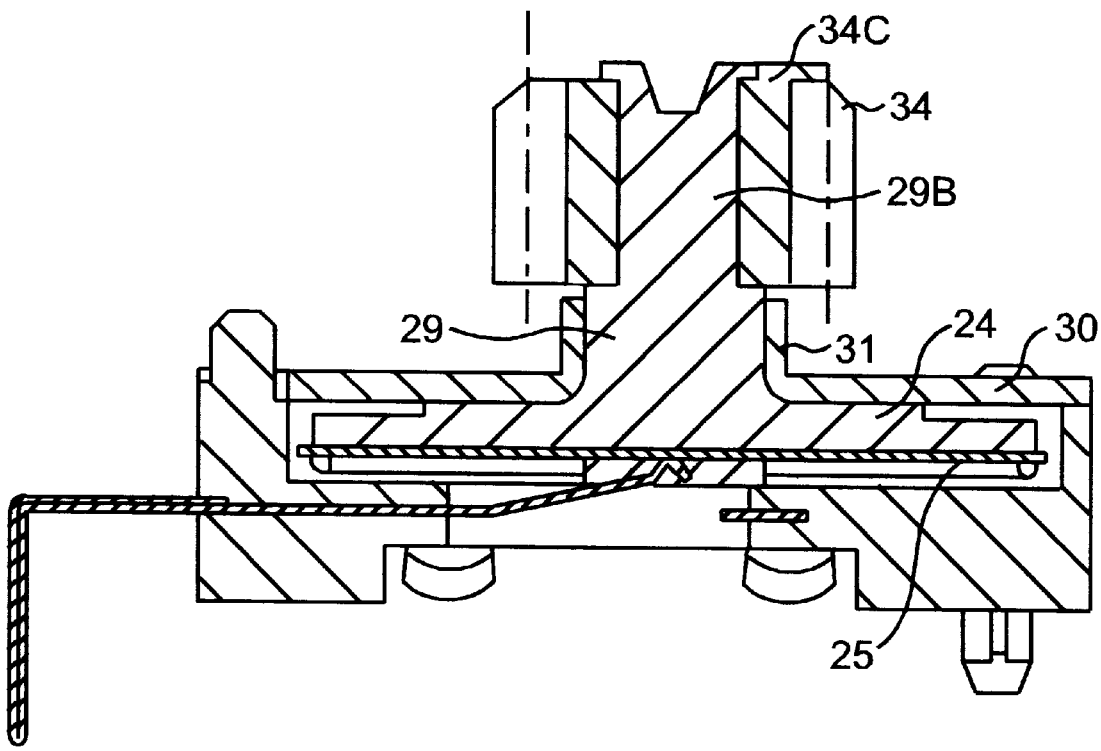
FIG. 6 is a sectional view of an encoder for a game machine according to a second embodiment of the invention.
Figure 7:
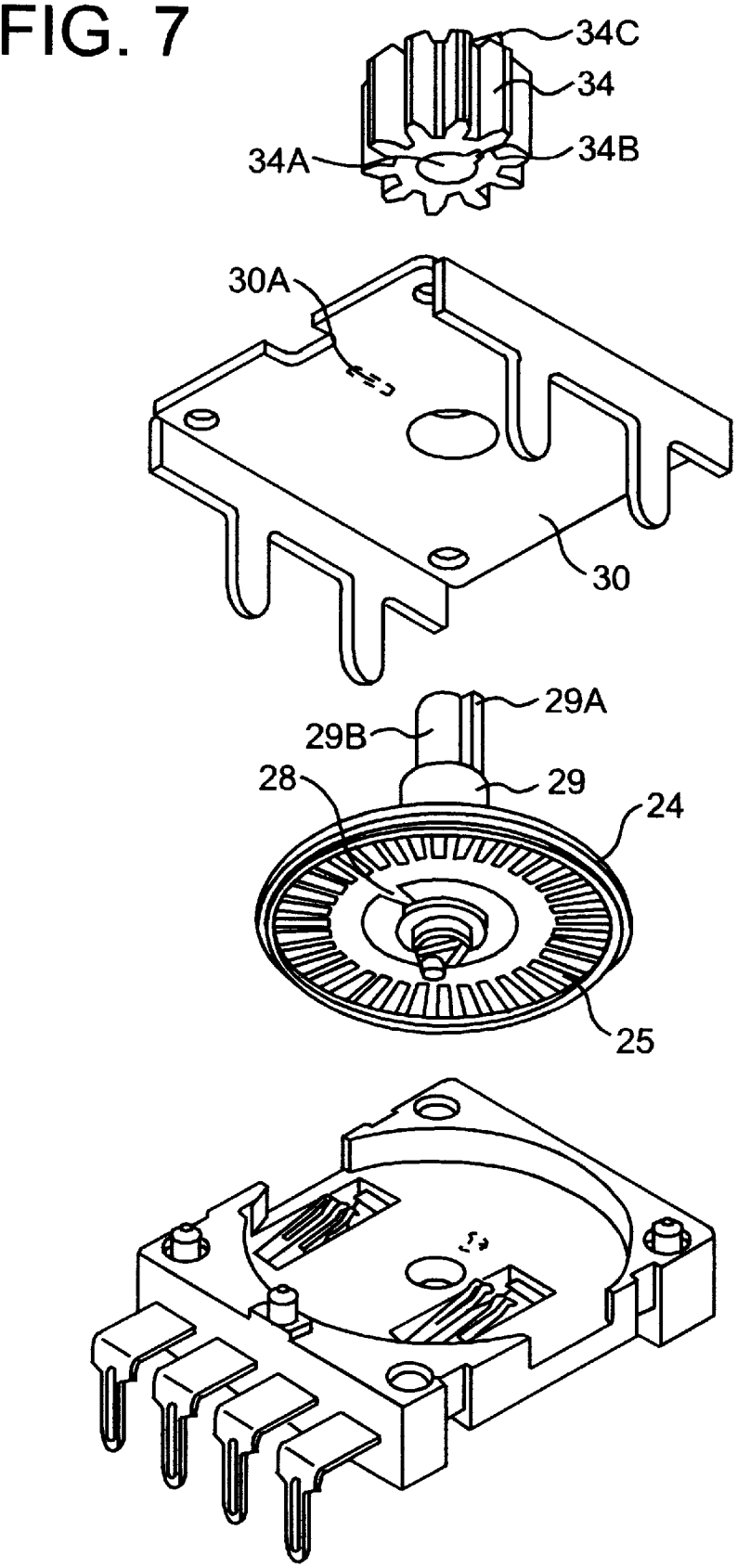
FIG. 7 is a perspective exploded view of the encoder shown in FIG. 6.

FIG. 6 is a sectional view of an encoder according to a second embodiment of the invention, and FIG. 7 is a perspective exploded view of FIG. 6. As shown in FIG. 6 and FIG. 7, the encoder according to the second embodiment further comprises a driving gear 34, in addition to the encoder of embodiment 1.

In a taper 29B at the leading end of the rotary shaft 29, a central hole 34A of the driving gear 34 is formed. That is, a protrusion 29A on the periphery of the taper 29B is fitted into a slot 34B of the central hole 34A, the rotary contact 25 of the rotary contact panel 24 and the driving gear 34 are set at a specified angle and position relation, and then the leading end of the taper 29B is crimped, thus, fixing driving gear 34 to taper 29B.

To detect the rotation position of the detection signal portion 28 for detecting the origin position of the rotary contact panel 24, a mark 34C is formed on the top of the driving gear 34, and a mark 30A is formed on the cover 30 at the position confronting the bearing 31. By visually checking if the positions of the mark 34C and mark 30A are matched, it is easily recognized whether the detection signal portion 28 is at the origin position (that is, in an ON state).

Since the mark 34C is formed at the lower end of the driving gear 34 and the mark 30A is formed near the root of the bearing 31, the mark 34C and mark 30A are close to each other, so that the angle position can be recognized easily.

Figure 8:
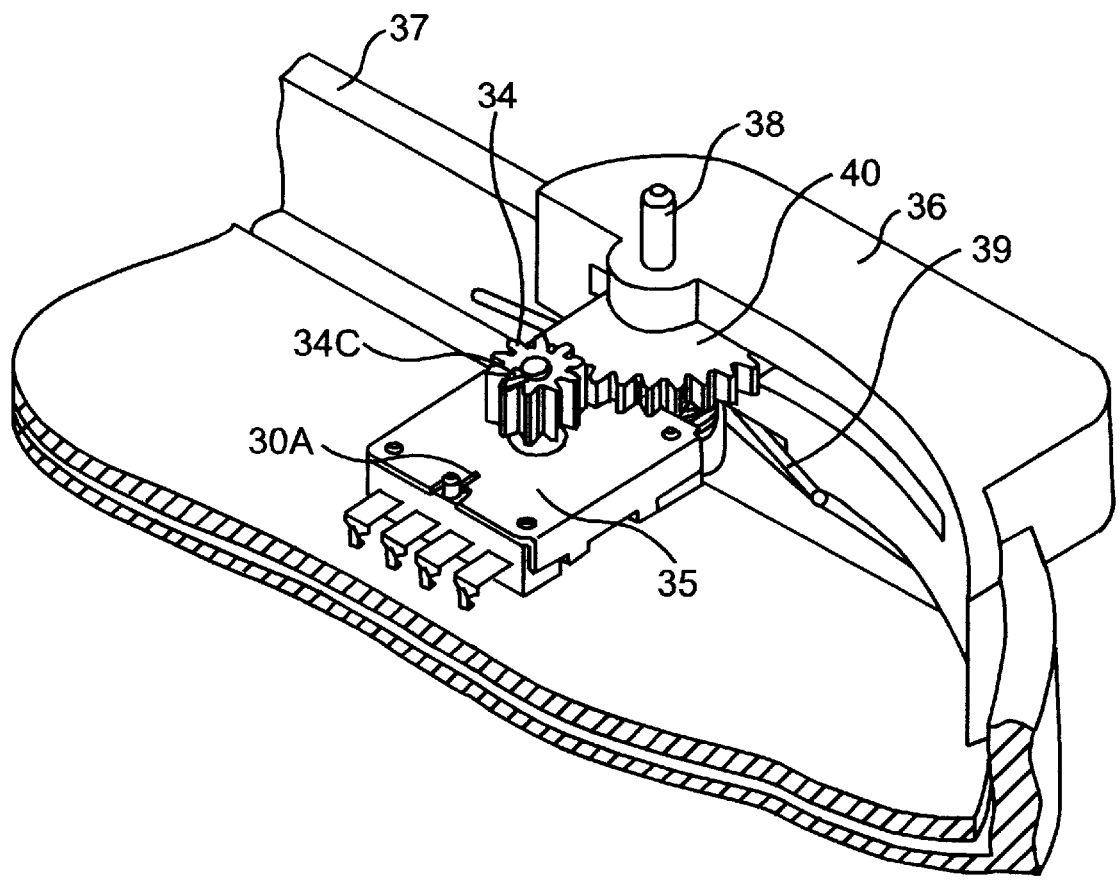
FIG. 8 is a perspective view of a partial section showing the encoder shown in FIG. 6 assembled with a manipulator for a game machine.

FIG. 8 is a partial perspective of the thus constituted encoder 35 incorporated in the R lever 36 of a manipulator for a game machine such as a TV game. In FIG. 8, a shaft 38 is provided in a long flat casing 37. The R lever 36 is rotatably fitted to the shaft 38, and is biased outwardly by a return spring 39. A gear block 40 is attached to the R lever 36. The gear block 40 is engaged with the driving gear 34 of the encoder 35. When the R lever 36 rotates about the shaft 38, the driving gear 34 and rotary contact panel 24 of the encoder 35 rotate at a multiple number corresponding to the gear ratio of the gear block 40 and driving gear 34. The gear ratio is set to enhance resolution.

In the case of incorporating encoder 35 into the manipulator for a game machine, when the R lever 36 is biased by the return spring 39 to be set in fully biased-out state, the detection signal of the encoder 35 is ON. That is, when encoder 35 is assembled such that the mark 34C at the upper end of the driving gear 34 coincides with the mark 30A at the side of the bearing 31, adjustment of phase difference between signal A and signal B as is the case in the prior art is not necessary.

By manipulating the R lever 36, the origin position detection signal is changed from ON to OFF, and up/down counting is started by signal A and signal B which are the two signals having the phase difference in the encoder 35. If a miscount occurs due to chattering or the like, and the count is not returned to zero when the R lever 36 is returned to the fully biased state, the count is nevertheless forced to reset to zero when the detection signal for detection of the origin position is turned on. Accordingly, the reliability of the encoder according to the present invention is substantially enhanced, and the function of the manipulator for a game machine is markedly improved.

Third Embodiment

Figure 9:
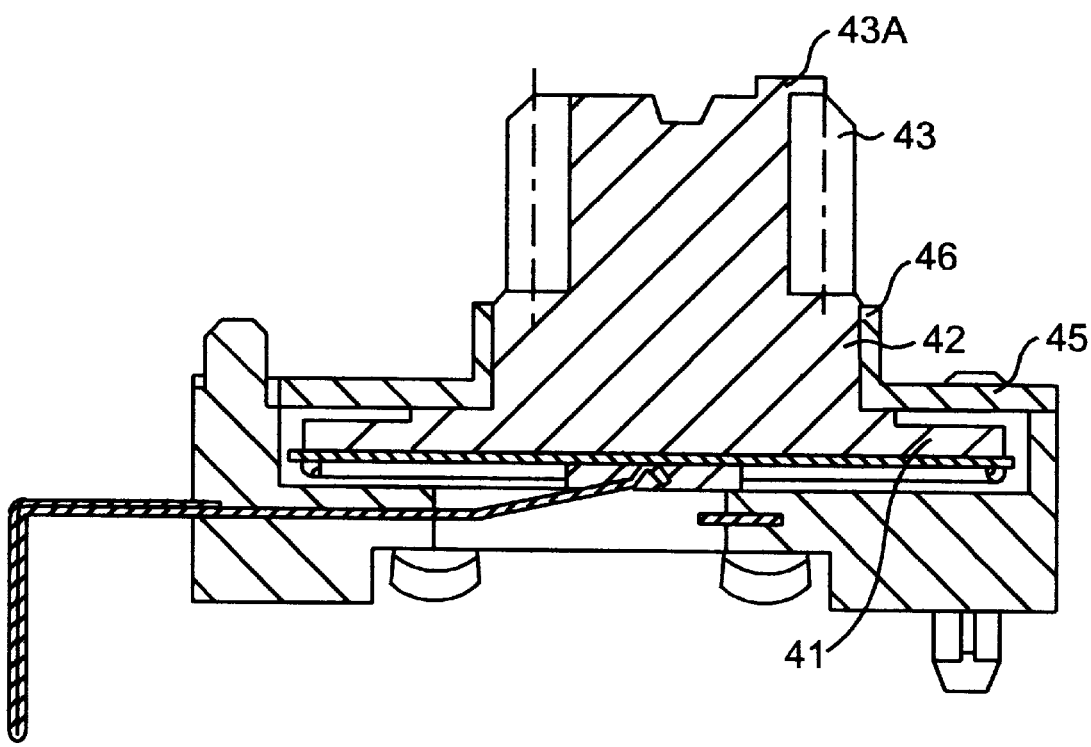
FIG. 9 is a sectional view of an encoder for a game machine according to a third embodiment of the invention.
Figure 10:
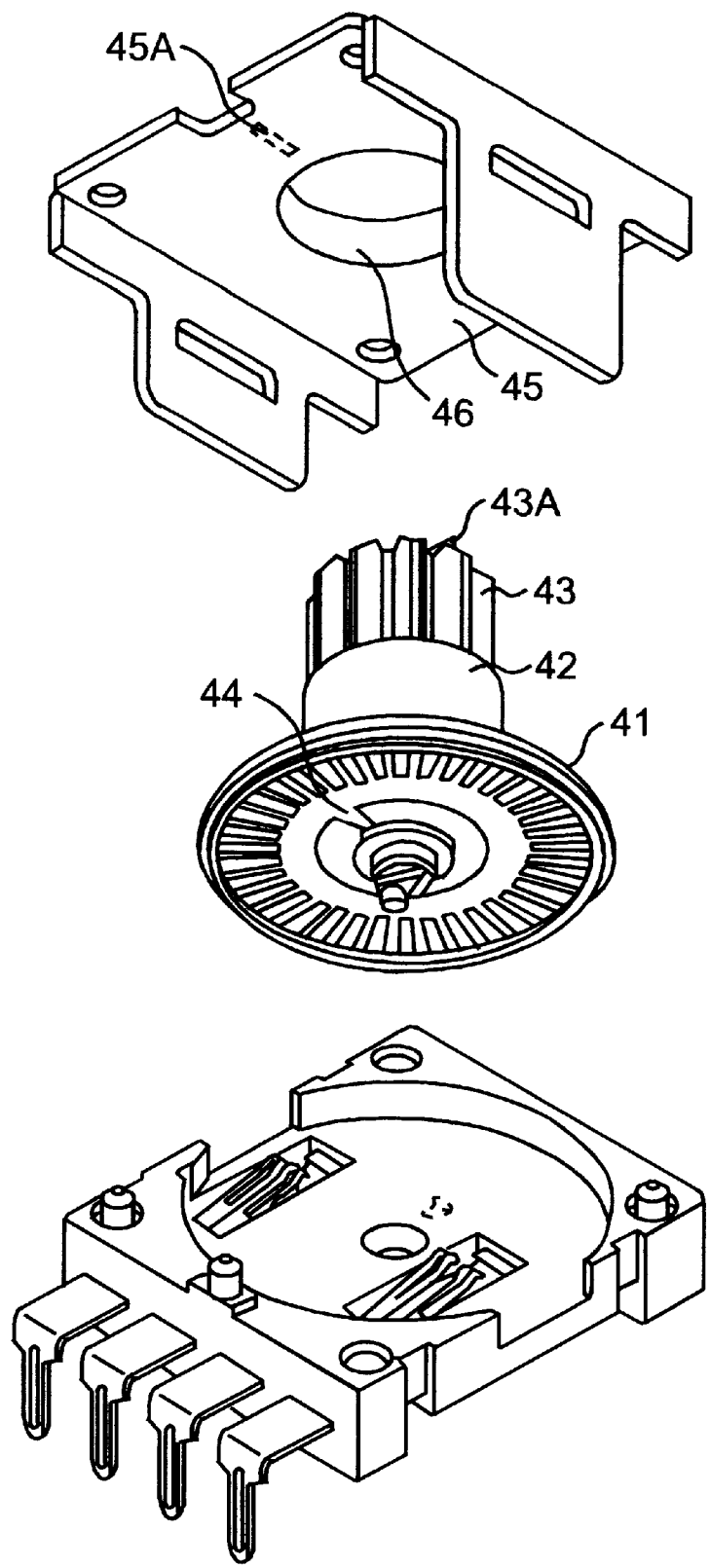
FIG. 10 is a perspective exploded view of the encoder shown in FIG. 9.

FIG. 9 is a sectional view of an encoder according to a third embodiment of the invention, and FIG. 10 is a perspective exploded view of FIG. 9. As shown in FIG. 9 and FIG. 10, the encoder according to this embodiment is similar to the encoder in the first embodiment, except that a driving gear 43 is integrally formed on the upper part of a rotary shaft 42 of a rotary contact panel 41 by using an electrically insulated resin. The configuration of the central portion and angle position of the rotary contact panel 41 and driving gear 43 can be determined accurately and stably by the molding die, and moreover an assembly step for mounting the driving gear 43 on the rotary contact panel 41 is no longer necessary.

In this embodiment, too, a mark 43A for detecting the rotation position of a detection signal portion 44 for detecting the origin position of the rotary contact panel 41 is provided at the upper end of the driving gear 43. By observing whether the mark 43A coincides with a mark 45A formed at the side of the bearing 45, it is easily recognized whether the origin position detection signal portion 44 is at the origin position (that is, in an ON state).

Fourth Embodiment

Figure 12:
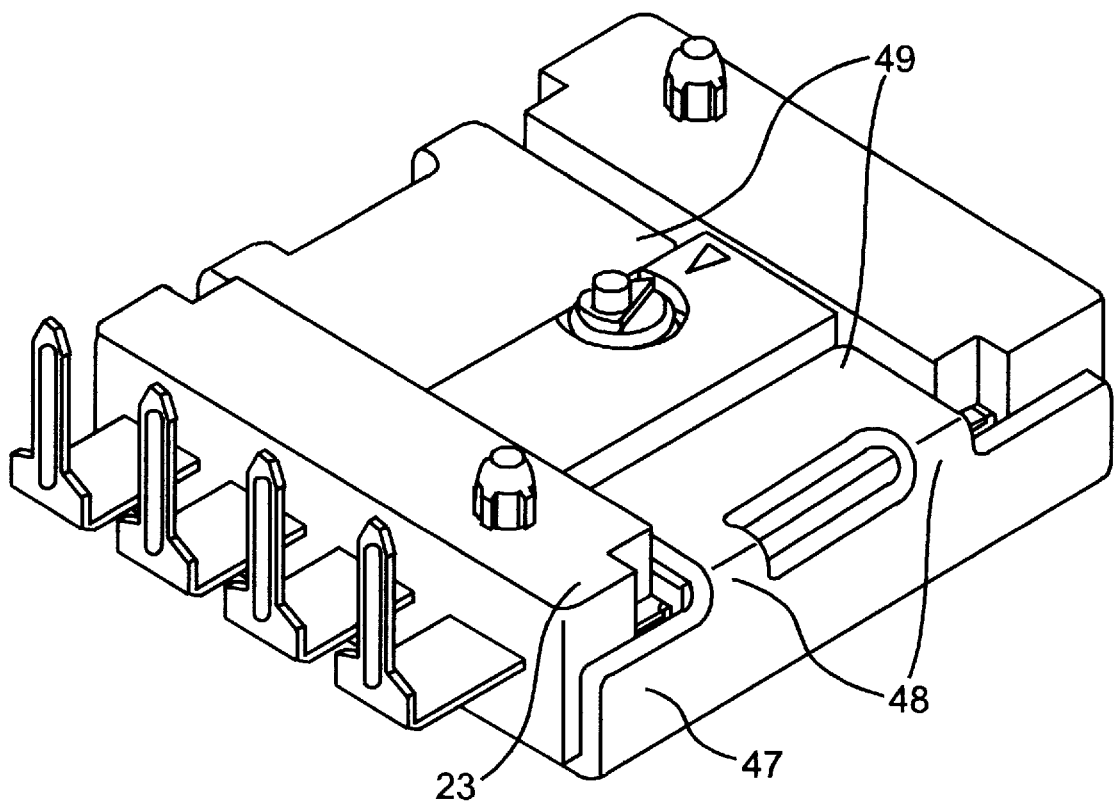
FIG. 12 is an underside perspective view of the encoder shown in FIG. 11.
Figure 13:
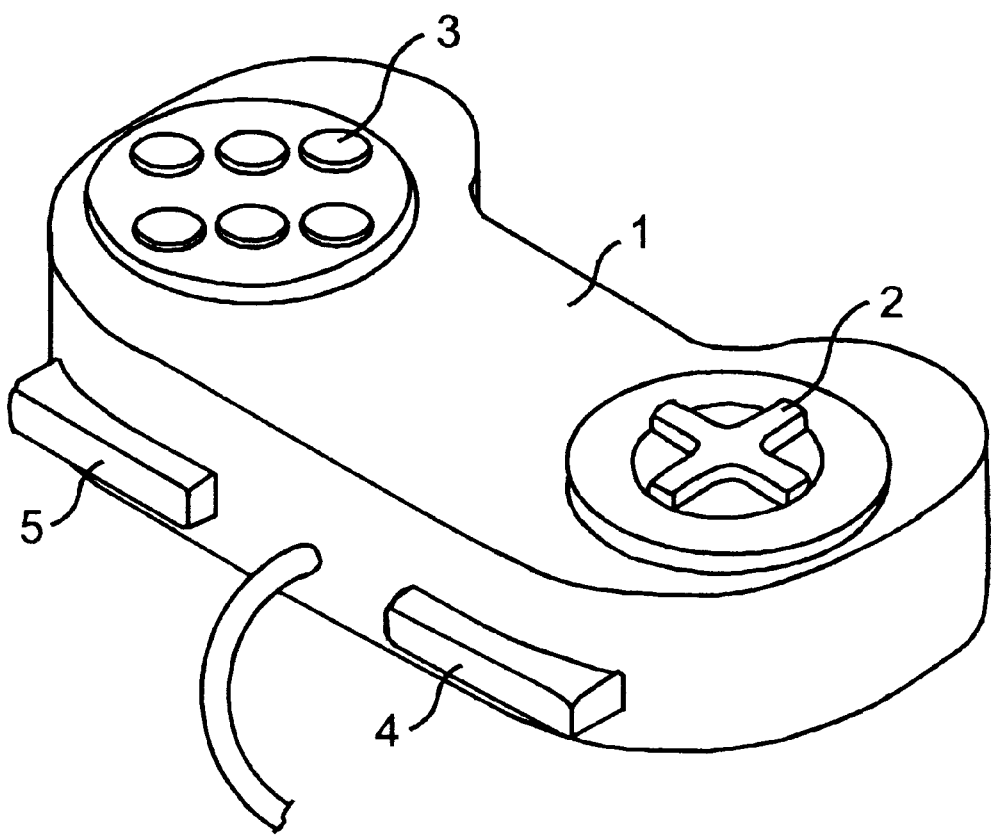
FIG. 13 is a perspective view of a conventional manipulator for game machine.
Figure 14:
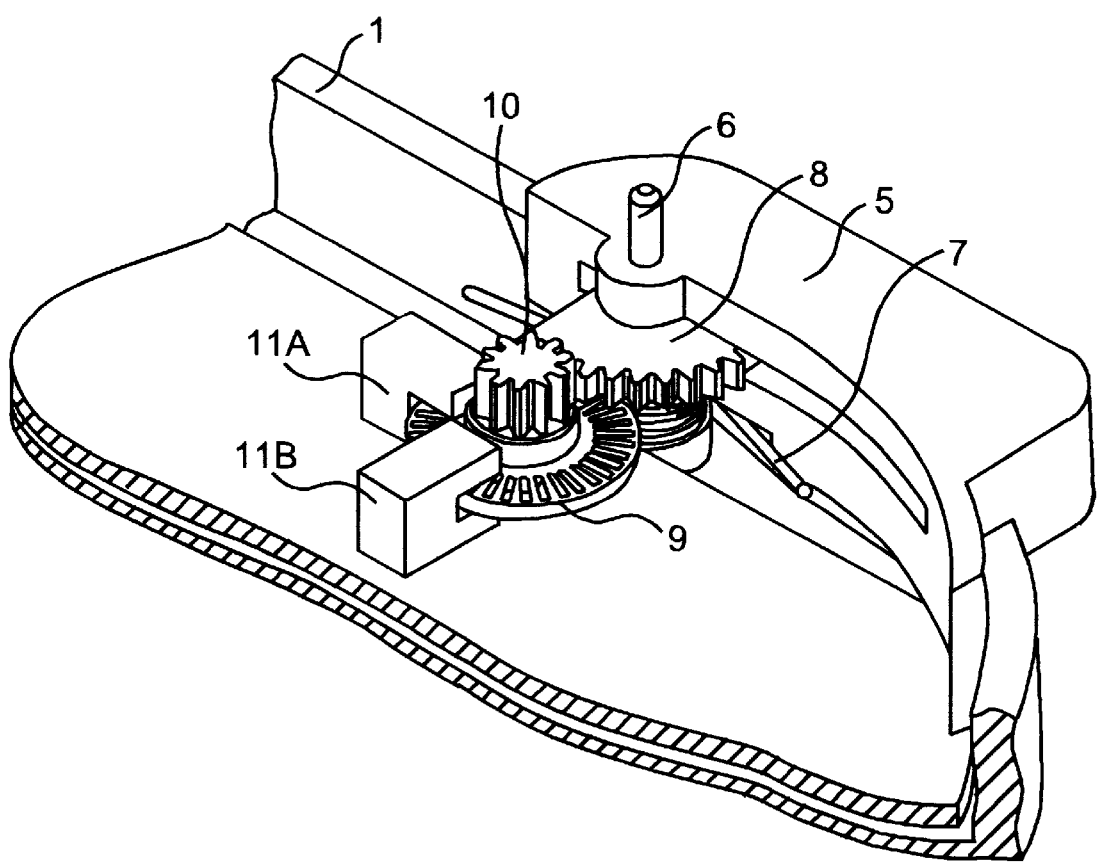
FIG. 14 is a perspective view of a partial section showing the structure of an R lever unit of the conventional manipulator for a game machine shown in FIG. 13.
Figure 15:
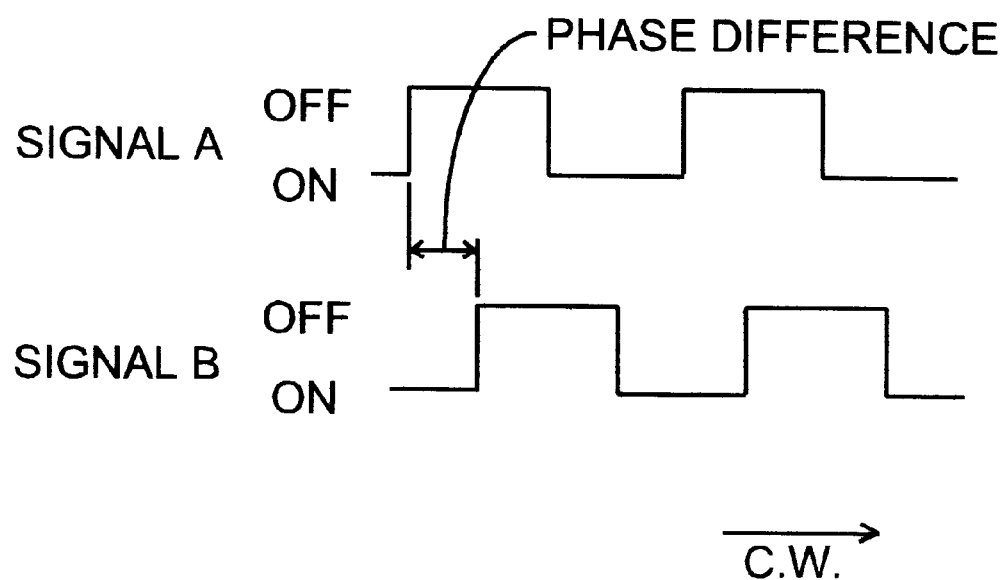
FIG. 15 is a waveform diagram of output signals of the conventional manipulator shown in FIG. 13.

FIG. 11 is a perspective exploded view of an encoder according to a fourth embodiment of the invention, and FIG. 12 is an underside perspective view of the encoder in FIG. 11. As shown in FIG. 11 and FIG. 12, the encoder of the present embodiment is basically the same as that of the first embodiment, except that the leading end of a leg 48 extended downward from the periphery of a cover 47 has a flat portion 49 with a specified area.

When assembling the encoder according to this embodiment, the cover 47 is assembled into the brush board 23, and the leading end of the leg 48 of the cover 47 is folded to the central side of the bottom of the brush board 23. The folded flat portion 49 is positioned to cover an opening 50 of the bottom of the brush board 23. The opening 50 is formed when forming the contact brush 21 on the brush board 23 by insert molding.

In this embodiment, the dustproof property of the encoder for game machine is substantially enhanced and the reliability of the game machine is thus even further improved.

Thus, according to the invention, by composing the detection signal portion for detecting the origin position on the contact type encoder, when constituting the manipulator for a game machine by using the contact type encoder, if an error due to miscounting occurs, it can be reset every time the encoder returns to the origin position, and accumulation of errors can be prevented.

Moreover, with the encoder of the present invention, the contact type encoder can be used in a manipulator for a game machine, and a reliable analog input device can be constituted. Also, the cost of the present encoder is substantially lower compared to conventional photo interrupter systems.

Yet another problem of conventional encoders for game machines is overcome by the present invention. In conventional encoders, if the power source is turned on while the R lever is being depressed, this state is judged to be the origin by the software, and therefore, if the R lever is in the fully pushed-in state, a corresponding counting is not obtained, and a malfunction occurs. In contrast, in the present invention, with the arrangement of the origin position detection signal, once the R lever is returned, the origin position detection signal is turned on, so that the counting can be reset. As a result, malfunction can be prevented.

While the principles of the encoder have been described in certain detail, it will be appreciated by those skilled in the art that various modifications and embodiments of the present invention may be used without departing from the present invention which is defined by the following claims.

What is claimed is:

1. An encoder for a game machine, comprising:
    a rotatable rotary contact panel having a top, a bottom, and a rotary shaft formed in at least one of said top and said bottom,
    a first contact portion, a second contact portion, and a third contact portion disposed on said bottom of said rotary contact panel, and
    plural mutually electrically isolated contact brushes biased toward at least one of said first contact portion, said second contact portion, and said third contact portion,
    wherein when said rotary contact panel rotates, at least two sets of contact brushes out of said plural contact brushes open and close to provide a first electrical signal and a second electrical signal having waveforms mutually different in phase, and another set of contact brushes out of said plural contact brushes opens and closes to provide a detection signal for detecting an origin position of said rotary contact panel.

2. The encoder of claim 1, further comprising a bearing for rotatably supporting said rotary contact panel, wherein said rotary shaft is engaged with said bearing.

3. The encoder of claim 1, wherein said first contact portion, said second contact portion, and said third contact portion are respectively disposed on concentric first, second and third circles, each having its center corresponding with the center of said rotary shaft of said rotary contact panel, said first contact portion is a comb-shaped contact portion arranged on said first circle, said second contact portion is a common contact portion having continuous contacts on said second circle, and said third contact portion has at least one contact portion on said third circle.

4. The encoder of claim 2, wherein said plural contact brushes have a first contact brush, a second contact brush, a third contact brush, and a fourth contact brush, said comb-shaped contact portion elastically contacts with said first contact brush and said second contact brush, said common contact portion elastically contacts with said fourth contact brush, said third contact portion elastically contacts with said third contact brush, and wherein when said rotary contact panel rotates one turn, said first electrical signal having a first waveform is obtained between said first contact brush and said fourth contact brush, said second electrical signal having a second waveform is obtained between said second contact brush and said fourth contact brush, said first waveform and said second waveform have mutually different phases, and said detection signal having one pulse is obtained between said third contact brush and said fourth contact brush.

5. The encoder of claim 1, further comprising an electrically insulated brush board on which individual contact brushes of said plural contact brushes are maintained in a predetermined position.

6. The encoder of claim 5, wherein each of said plural contact brushes has a terminal at one end thereof, a part of said terminal is maintained in a predetermined position on said brush board, and an end portion of said terminal is exposed from said brush board.

7. The encoder of claim 6, wherein said brush board comprises a resin member having terminals integrally molded with said resin member.

8. The encoder of claim 5, further comprising plural terminals held in said brush board, wherein a portion of each one of said contact brushes is electrically linked to each terminal of said plural terminals.

9. The encoder of claim 8, wherein said brush board comprises a resin member, and said portion of each one of said contact brushes and said terminals are integrally molded with said resin member.

10. The encoder of claim 1, further comprising a bearing rotatably holding said rotary contact panel, an electrically insulated brush board maintaining in a predetermined position each contact brush of said plural contact brushes, and a cover body fixing said bearing, wherein a disk of said rotary contact panel is disposed between said brush board and cover body.

11. The encoder of claim 2, wherein a first mark is disposed near the leading end of said rotary shaft, and a second mark is disposed in at least one of an outer bottom portion of said brush board and near said bearing, whereby the position of said origin can be determined by comparing the positions of said first mark and said second mark.

12. The encoder of claim 1, wherein said rotary shaft comprises a gear engaged with another gear installed in the game machine.

13. The encoder of claim 1, wherein the leading end of said rotary shaft is engaged with a drive unit of the game machine.

14. An encoder for a game machine, comprising:
a rotatable rotary contact panel having a top, a bottom, and a rotary shaft formed in at least one of said top and said bottom,
a first contact portion, a second contact portion, and a third contact portion disposed on said bottom of said rotary contact panel,
plural contact brushes having contact portions formed at one end and terminals formed at a second end,
a bearing rotatably holding said rotary contact panel, and
an electrically insulated brush board maintaining in a predetermined position each contact brush of said plural contact brushes,
wherein said first contact portion, said second contact portion, and said third contact portion, are respectively disposed on concentric first, second circle and third circles, each having its center corresponding with the center on said rotary shaft of said rotary contact panel, said first contact portion is a comb-shaped contact portion arranged on said first circle, said second contact portion is a common contact portion having continuous contacts on said second circle, and said third contact portion has at least one contact portion on said third circle, said contact portion of each contact brush of said plural contact brushes is biased toward at least one of said first contact portion, said second contact portion, and said third contact portion, said brush board comprises a resin member, a portion of each contact brush is maintained in a predetermined position with respect to said brush board by said resin member, and when said rotary contact panel rotates, at least two sets of contact brushes out of said plural contact brushes open and close to provide a first electrical signal and a second electrical signal having a waveform mutually different in phase from the first electrical signal, and another set of contact brushes out of said plural contact brushes opens and closes to provide a detection signal for detecting the origin position of said rotary contact panel.

15. The encoder of claim 14, wherein said plural contact brushes have a first contact brush, a second contact brush, a third contact brush, and a fourth contact brush, said comb-shaped contact portion elastically contacts said first contact brush and said second contact brush, said common contact portion elastically contacts said fourth contact brush, said third contact portion elastically contacts said third contact brush, and when said rotary contact panel rotates one turn, said first electrical signal having a first waveform is provided between said first contact brush and said fourth contact brush, said second electrical signal having a second waveform is provided between said second contact brush and said fourth contact brush, said first waveform and said second waveform having mutually different phases, and said detection signal having one pulse is provided between said third contact brush and said fourth contact brush.

16. An encoder for a game machine, comprising:
a rotatable rotary contact panel having a top, a bottom, and a rotary shaft formed in at least one of said top and said bottom, a first contact portion, a second contact portion, and a third contact portion disposed on said bottom of said rotary contact panel, plural contact brushes, mutually isolated electrically, biased toward at least one contact portion out of said first contact portion, said second contact portion, and said third contact portion, a bearing rotatably holding said rotary contact panel, and a brush board having a penetration hole, being disposed at said bottom side of said rotary contact panel, wherein when said rotary contact panel rotates, a least two sets of contact brushes out of said plural contact brushes open and close to provide a first electrical signal and a second electrical signal having a waveform mutually different in phase from the first electrical signal, and another set of contact brushes out of said plural contact brushes opens and closes to provide a detection signal for detecting the origin position of said rotary contact panel, and wherein said rotary contact panel has said rotary shaft projecting from said bottom, the leading end of said rotary shaft projects from said penetration hole, a first mark is disposed near said leading end of said rotary shaft, a second mark is disposed near said penetration hole of said brush board, whereby said origin position of said rotary contact panel can be determined by comparing the positions of said first mark and said second mark.

17. The encoder of claim 16, wherein said brush board is electrically insulated and maintains in a predetermined position each contact brush of said plural contact brushes.

18. The encoder of claim 16, wherein said rotary shaft has a further rotary shaft projecting from said top of said rotary contact panel, and a gear disposed on said rotary shaft engaged with another gear disposed in the game machine.

19. The encoder of claim 16, further comprising:

a cover body fixing said bearing, wherein a disk of said rotary contact panel is disposed between said brush board and said cover body.

20. An encoder for game machine, comprising:

a rotatable rotary contact panel having a top, a bottom, and a rotary shaft formed in at least one of said top and said bottom, a first contact portion, a second contact portion, and a third contact portion disposed on said bottom of said rotary contact panel, plural contact brushes, mutually isolated electrically, biased toward at least one of said first contact portion, said second contact portion, and said third contact portion, a bearing rotatably holding said rotary contact panel, and a brush board having a penetration hole, being disposed at said top side of said rotary contact panel, wherein when said rotary contact panel rotates, at least two sets of contact brushes out of said plural contact brushes open and close to provide a first electrical signal and a second electrical signal having a waveform mutually different in phase from the first electrical signal, and another set of contact brushes out of said plural contact brushes opens and closes to provide a detection signal for detecting the origin position of said rotary contact panel, and said rotary contact panel has said rotary shaft projecting from said top, said rotary shaft is engaged with said bearing, the leading end of said rotary shaft projects from said penetration hole, a first mark is formed near said leading end of said rotary shaft, a second mark is formed near said penetration hole of said brush board, whereby said origin position can be determined by comparing the positions of said first mark and said second mark.

21. The encoder for a game machine, comprising:

a rotatable rotary contact panel having a top, a bottom, and a rotary shaft formed in at least one of said top and said bottom, a first contact portion, a second contact portion, and a third contact portion disposed on said bottom of said rotary contact panel, plural contact brushes, mutually isolated electrically, biased toward at least one of said first contact portion, said second contact portion, and said third contact portion, a bearing rotatably holding said rotary contact panel, and a driving gear arranged on said rotary shaft, wherein when said rotary contact panel rotates, at least two sets of contact brushes out of said plural contact brushes open and close to provide a first electrical signal and a second electrical signal having a waveform mutually different in phase from the first electrical signal, and another set of contact brushes out of said plural contact brushes opens and closes to provide a detection signal for detecting the origin position of said rotary contact panel, and wherein said rotary shaft is fitted with said bearing, and is projected from said bearing, said driving gear is disposed in the projecting portion of said rotary shaft, a first mark is disposed at least above or below said driving gear, a second mark is disposed near said bearing, whereby said origin position can be determined by comparing the positions of said first mark and said second mark.

22. The encoder of claim 21, wherein said driving gear is engaged with another gear of the game machine.

23. The encoder of claim 21, wherein said driving gear and said rotary shaft are integrally formed.

24. The encoder of claim 21, further comprising an electrically insulated brush board maintaining in a predetermined position each contact brush of said plural contact brushes, and a cover body fixing said bearing, wherein a disk of said rotary contact panel is disposed between said brush board and said cover body.

25. The encoder of claim 21, wherein said rotary contact panel having said gear and said rotary shaft is a single integrally-formed resin body.

26. An encoder for a game machine, comprising:

a rotatable rotary contact panel having a top, a bottom, and a rotary shaft formed in at least one of said top and said bottom, a first contact portion, a second contact portion, and a third contact portion disposed on said bottom of said rotary contact panel, plural contact brushes having contact portions formed at one end and terminals formed at another end, a bearing rotatably holding said rotary contact panel, an electrically insulated brush board maintaining in a predetermined position each contact brush of said plural contact brushes, and a cover body disposed at said top side of said rotary contact panel, and fixing said bearing, wherein said first contact portion, said second contact portion, and said third contact portion are respectively disposed on concentric first, second and third circles, each having centers corresponding with the center of said rotary shaft of said rotary contact panel, said first contact portion is a comb-shaped contact portion arranged on said first circle, said second contact portion is a common contact portion having continuous contacts on said second circle, and said third contact portion has at least one contact portion on said third circle, said contact portion of each contact brush of said plural contact brushes is biased toward at least one of said first contact portion, said second contact portion, and said third contact portion, said brush board comprises a resin member, a portion of each contact brush is maintained in a predetermined position with respect to said brush board by said resin member, said cover body is fixed on said brush board, incorporating said rotary contact panel, and when said rotary contact panel rotates, at least two sets of contact brushes out of said plural contact brushes open and close to provide a first electrical signal and a second electrical signal having a waveform mutually different in phase from the first electrical signal, and another set of contact brushes out of said plural contact brushes opens and closes to provide a detection signal for detecting the origin position of said rotary contact panel.

27. The encoder of claim 26, wherein said bearing and said cover body comprise metal plates, and said cover body is disposed to cover the opening of said brush board.

28. The encoder for a game machine, comprising:

a rotatable rotary contact panel having a top, a bottom, and a rotary shaft formed in at least one of said top and said bottom, a first contact portion, a second contact portion, and a third contact portion disposed on said bottom of said rotary contact panel, plural contact brushes having contact portions formed at one end and terminals formed at a second end, a bearing rotatably holding said rotary contact panel, an electrically insulated brush board, disposed at said bottom side, maintaining in a predetermined position each contact brush of said plural contact brushes, and forming a penetration hole, and a cover body disposed at said top side of said rotary contact panel, and fixing said bearing, wherein said first contact portion, said second contact portion, and said third contact portion are respectively disposed on concentric first, second and third circles having centers corresponding with the center on said rotary shaft of said rotary contact panel, said first contact portion is a comb-shaped contact portion arranged on said first circle, said second contact portion is a common contact portion having continuous contacts on said second circle, and said third contact portion has at least one contact portion on said third circle, said contact portion of each contact brush of said plural contact brushes is biased toward at least one of said first contact portion, said second contact portion, and said third contact portion, said brush board comprises a resin member, a portion of each contact brush is maintained in a predetermined position with respect to said brush board by said resin member, said rotary shaft has a first rotary shaft projecting from said top, and a second rotary shaft projecting from said bottom, said first rotary shaft is fitted with said bearing, and projects from said bearing, the leading end of said second rotary shaft extends from said penetration hole, and at least one set of (i) a first mark disposed near said leading end of said second rotary shaft and a second mark disposed near said penetration hole of said brush board and (ii) a third mark disposed near said leading end of said first rotary shaft and a fourth mark disposed near said bearing of said cover body, wherein said origin position of said rotary contact panel can be determined by comparing the positions of said one set, and when said rotary contact panel rotates, at least two sets of contact brushes out of said plural contact brushes open and close to provide a first electrical signal and a second electrical signal having a waveform mutually different in phase from the first electrical signal, and another set of contact brushes out of said plural contact brushes opens and closes to provide a detection signal for detecting the origin position of said rotary contact panel.

29. The encoder of claim 28, wherein said plural contact brushes have a first contact brush, a second contact brush, a third contact brush, and a fourth contact brush, said comb-shaped contact portion elastically contacts with said first contact brush and said second contact brush, said common contact portion elastically contacts with said fourth contact brush, said third contact portion elastically contacts with said third contact brush, when said rotary contact panel rotates one turn, said first electrical signal having a first waveform is provided between said first contact brush and said fourth contact brush, said second electrical signal having a second waveform is provided between said second contact brush and said fourth contact brush, said first waveform and said second waveform have mutually different phases, and said detection signal having one pulse is provided between said third contact brush and said fourth contact brush.

30. The encoder of claim 28, wherein said bearing and said cover body comprise metal plates, and said cover body is disposed to cover an opening of said brush board.

* * * * *